(12) United States Patent
Anderson

(10) Patent No.: US 8,723,956 B2
(45) Date of Patent: May 13, 2014

(54) METHOD AND APPARATUS OF CAMERA CONTROL

(75) Inventor: Jeremy L Anderson, Prospect (AU)

(73) Assignee: Trace Optic Technologies Pty Ltd, Mawson Lakes (AU)

( * ) Notice: Subject to any disclaimer, the term of this patent is extended or adjusted under 35 U.S.C. 154(b) by 1383 days.

(21) Appl. No.: 11/991,118

(22) PCT Filed: Aug. 30, 2005

(86) PCT No.: PCT/AU2005/001302
§ 371 (c)(1),
(2), (4) Date: Feb. 27, 2008

(87) PCT Pub. No.: WO2006/024078
PCT Pub. Date: Mar. 9, 2006

(65) Prior Publication Data
US 2009/0262193 A1 Oct. 22, 2009

(30) Foreign Application Priority Data
Aug. 30, 2004 (AU) .................... 2004904910

(51) Int. Cl.
H04N 7/18 (2006.01)
(52) U.S. Cl.
USPC ........................................... 348/157
(58) Field of Classification Search
USPC ........................................... 348/157
See application file for complete search history.

(56) References Cited

U.S. PATENT DOCUMENTS

| | | | |
|---|---|---|---|
| 5,164,827 A | 11/1992 | Paff | |
| 5,774,569 A * | 6/1998 | Waldenmaier | 382/100 |
| 5,873,007 A | 2/1999 | Suarez | |
| 5,912,700 A | 6/1999 | Honey et al. | |
| 5,982,420 A | 11/1999 | Ratz | |
| 6,023,287 A * | 2/2000 | Kimura et al. | 348/39 |
| 6,650,360 B1 * | 11/2003 | Osen | 348/157 |
| 7,154,540 B2 | 12/2006 | Honey et al. | |
| 7,884,855 B2 * | 2/2011 | Ortiz | 348/211.8 |
| 2002/0090217 A1 * | 7/2002 | Limor et al. | 396/429 |
| 2003/0026494 A1 * | 2/2003 | Woodell et al. | 382/260 |
| 2003/0210329 A1 * | 11/2003 | Aagaard et al. | 348/159 |
| 2005/0018045 A1 * | 1/2005 | Thomas et al. | 348/157 |
| 2005/0093976 A1 | 5/2005 | Valleriano et al. | |
| 2005/0202905 A1 | 9/2005 | Chesser | |
| 2005/0221890 A1 * | 10/2005 | Schatten et al. | 463/30 |
| 2005/0237392 A1 * | 10/2005 | Yoshida | 348/207.2 |
| 2006/0063574 A1 | 3/2006 | Richardson et al. | |
| 2007/0014432 A1 | 1/2007 | Tsunashima | |
| 2008/0192116 A1 * | 8/2008 | Tamir et al. | 348/157 |
| 2009/0086014 A1 * | 4/2009 | Lea et al. | 348/25 |

FOREIGN PATENT DOCUMENTS

| | | |
|---|---|---|
| JP | 50079158 | 2/1977 |
| JP | 60001978 | 1/1985 |
| JP | 63013475 | 1/1988 |
| JP | 06133189 | 5/1994 |
| JP | 2004207884 | 7/2004 |
| WO | WO 02/03702 | 1/2002 |
| WO | WO 2006/118366 | 11/2006 |

* cited by examiner

*Primary Examiner* — Andy Rao
*Assistant Examiner* — James Edwards
(74) *Attorney, Agent, or Firm* — Defillo & Associates, Inc; Evelyn A. Defillo

(57) ABSTRACT

The present invention relates to an automated camera control system (10). The automated camera control system (10) is a control management system for television broadcasting at a track based event, such as horse or motor racing. The automated camera control system (10) allows a single operator (54) to simultaneously control a plurality of cameras (16). The automated camera control system (10) improves the compositional quality of the footage. The operator (54) can simultaneously perform all the functions of a director including vision switching and camera setting for the outgoing television broadcast (86).

13 Claims, 9 Drawing Sheets

1

METHOD AND APPARATUS OF CAMERA CONTROL

CROSS REFERENCE TO RELATED APPLICATION

This application is a national stage of PCT/AU2005/001302 filed Aug. 30, 2005, under the International Convention.

FIELD OF THE INVENTION

The present invention relates to a camera control system.

BACKGROUND OF THE INVENTION

Sporting events have become popular with television audiences as the program provides superior coverage of the event. This is particularly true in sporting events such as motor racing where a spectator at the event is only able to glimpse a small part of the action. Television networks utilise a plurality of cameras at such events in an attempt to provide the best coverage for viewers, including car mounted, aerial, and tripod mounted and mobile cameras.

Typically a human operator is required to manually operate each camera.

Usually, these cameras are deliberately placed at particular locations around a race course in order to capture the best footage of the race. One of the difficulties with currently available systems is that the human operator may both miss action and incorrectly operate the camera. Furthermore, the cost associated with having to employ human operators for most cameras is financially restrictive.

Another use for cameras at sporting events is to capture images of the sporting contest for later viewing. This is particularly important in such sporting events as horse racing when protests are lodged after the race for reasons such as interference. In horse racing stewards study video replays from vantage points around the course to gauge if interference between the race participants has occurred. For this reason cameras referred to as "stewards cameras" are placed at particular locations around the race course to capture footage of the sporting event.

Sporting events such as thoroughbred, harness, greyhound and motor racing all have highly repetitive and formula driven broadcasts, which have simple requirements for the camera operator's framing. In the case of thoroughbred racing there are multiple camera operators employed although they are used only a fraction of the time while they are on site.

It is an object of the present invention to provide for a method and apparatus of camera control that overcomes at least some of the aforementioned problems or provides the public with a useful alternative. It is yet a further object of the present invention to provide for a method and apparatus of camera control that provides a labour saving solution.

It is still yet a further object of the present invention to provide for a method and apparatus of camera control that enhances accuracy and quality of the captured image.

SUMMARY OF THE INVENTION

Therefore in one form of the invention there is proposed an apparatus for camera control including: a plurality of slaved cameras each controllably adapted to assume a plurality of viewing directions; a control apparatus in communication with the plurality of slaved cameras and adapted to control the direction of the plurality of slaved cameras to simultaneously track a spatial node, moving at a known velocity and in a known direction.

Preferably, the node moves along a predetermined spatial path.

Preferably, the node can be offset from the predetermined spatial path in the horizontal and vertical planes.

Preferably, the apparatus individually controls separate functions of each of the slaved cameras.

Preferably, the functions are pan, tilt, zoom and focus.

Preferably, the functions are pre-programmed.

Preferably, the plurality of slaved cameras can be adapted to sequentially track one or more nodes.

Preferably, the plurality of slaved cameras are configured to frame a specified field of view around the node of known zoom length and zoom width.

Preferably, the field of view of the slaved cameras is manually adjusted.

Preferably, the field of view of the slaved cameras is automatically adjusted. Preferably, the field of view of the slaved camera encompasses an area surrounding the node regardless of the geographical location of the node.

Preferably, the zoom length can be controlled.

Preferably, the zoom width can be controlled.

Preferably, the field of view of each of the slaved cameras is collectively controlled by a zoom trigger device.

Preferably, the field of view of any one slaved camera is individually controlled using an individual zoom slider.

Preferably, the field of view of all slaved camera is controlled using a joystick zoom trigger and zoom thumb toggle.

Preferably, the size of the area surrounding the node is pre-programmed.

Preferably, the plurality of slaved camera's field of view around the node can be individually proportionally enlarged and contracted from the default field of view around the node using individual zoom sliders.

Preferably, the slaved cameras are adapted to automatically focus on the node.

Preferably, the velocity of the node is manually controlled.

Preferably, the velocity of the node is preprogrammed.

Preferably, the velocity of the node can be replayed after a manually altered preprogrammed run.

Preferably, apparatus for camera control further includes at least one unslaved camera.

Preferably, the slaved and unslaved cameras are mounted on an encoded servo pan tilt head apparatus.

Preferably, the node is sent to a known start position.

Preferably, the direction of movement of the node can be changed.

Preferably, the node is configured to assimilate with a desired target.

Preferably, the apparatus can recognise and interact with multiple nodes.

Preferably, the slaved and unslaved cameras are controlled using a joystick.

Preferably, the predetermined path includes a plurality of milestones.

Preferably, the velocity of the node and the slaved camera's focus, pan, tilt, and zoom functions are preprogrammed to specific milestones.

In a further form of the invention there is proposed a method of camera control including the steps of:
surveying a sporting environment;
placing a plurality of slaved cameras within the sporting environment;
determining the location of each individual camera;
controlling the movement of the plurality of slaved cameras, via a control apparatus, to simultaneously track a spatial node, moving at a known velocity and in a known direction.

Preferably, the plurality of cameras includes slaved and unslaved cameras.

Preferably, a camera's location is determined by the use of a plurality of survey markers and a resection survey method.

Preferably, one or more cameras are aligned onto the node.

Preferably, the slaved and unslaved cameras are mounted on an encoded servo pan tilt head to facilitate the tracking of the node.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

Figure 1:
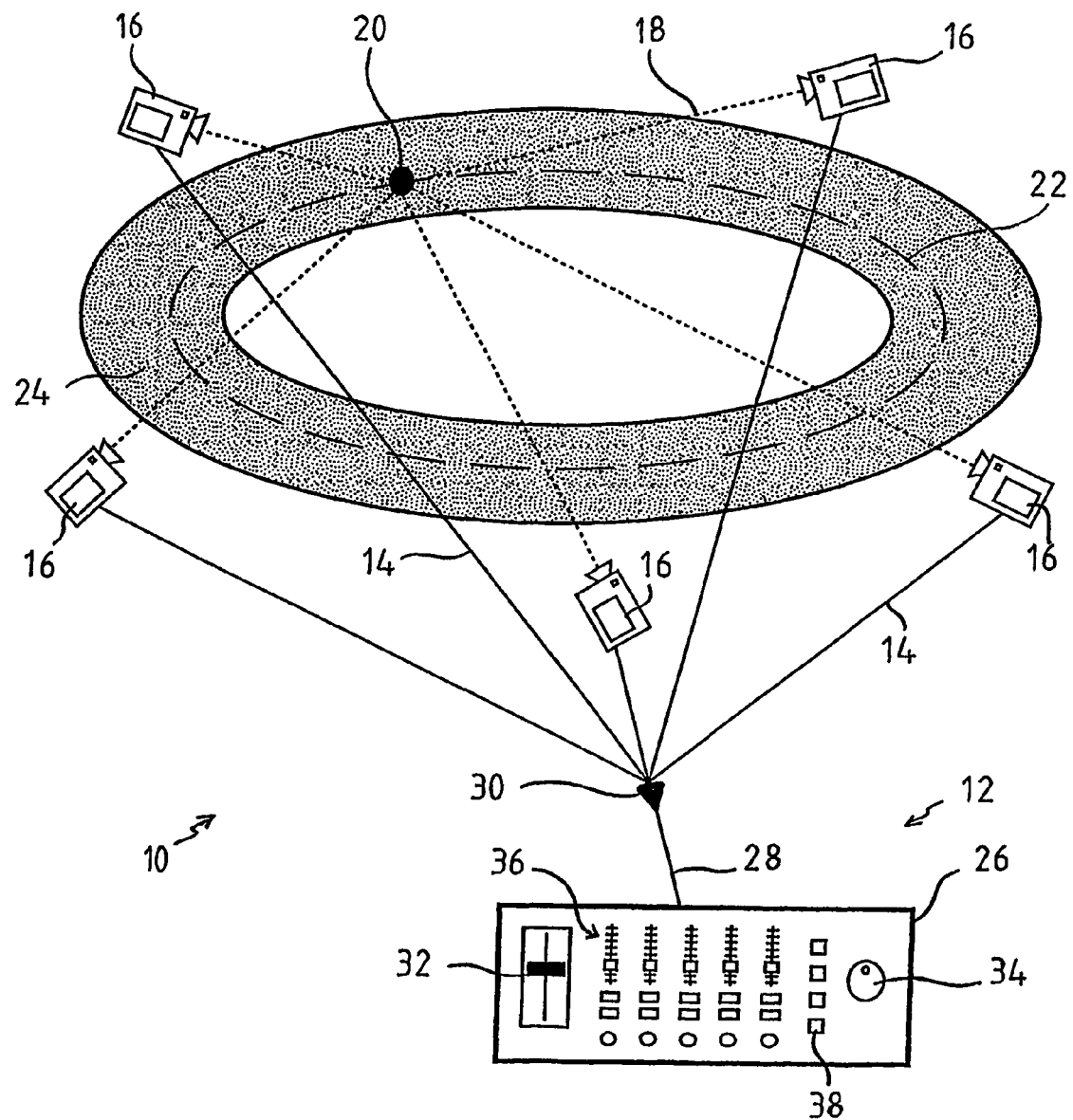
FIG. 1 is a schematic view of a first embodiment of a camera control system embodying the present invention.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts. Referring to the drawings for a more detailed description, a camera control system 10 is illustrated in FIG. 1, demonstrating by way of example one arrangement in which the principles of the present invention may be employed. The camera control system 10 includes a control apparatus 12 which is in communication 14 with a plurality of cameras 16. The control apparatus 12 is configured to control the movement of the cameras 16 to simultaneously train their respective centre lines 18 on a node 20 while automatically adjusting the field of view 70 (FIG. 7) and focus requirements. In this way a single operator can control a plurality of cameras 16 thereby avoiding the requirement of having an individual camera operator for each individual camera 16. The node 20 tracks along a predetermined path 22 within known parameters such as a race course 24. The camera control system 10 further includes control software (not shown) which controls predetermined functions of the invention. In its simplest form the operator can simply move the node 20.

The predetermined path 22 is established through a survey of a particular track 24. The surface of the track 24 is mapped and a mathematical matrix is calculated. A node 20 is then placed on a predetermined path 22 that typically follows the centre of the track in horse racing and the racing line in motor sports. Accordingly the node 20 has a series of predetermined x, y, z coordinates that are stored in a data table. The data table produced from the survey of the track 24 is stored for future use. The location of each of the individual cameras 16 is either determined by a survey or by a method commonly used by surveyors and referred to as a 'resection'. A 'resection' involves aligning and focusing the centre line 18 of each of the randomly located cameras 16 consecutively on a series of survey markers (not shown) with known geographical locations around the track 24. The survey markers are typically 600 mm circular signs with a painted crosshair. As the camera's 16 centre line 18 is aligned with three or more survey marker the camera's 16 orientation, namely its pan and tilt, is logged thereby enabling the geographical location of the camera 16 to be calculated. Alternatively, each camera 16 can include a GPS device which automatically calculates the position of the camera 16 and the camera need only be aligned to one survey marker. The geographical position and the pan and tilt information is then transmitted to the control apparatus 12. As the reader would appreciate the camera control system 10 can be used at any race track. The different tracks are surveyed to collect the geographical position of inside and outside rails, start area, finish line and installed survey markers which are used to resection the cameras 16. The survey information is entered into a software program such as CAD and milestones are inserted. The x, y, z coordinates of the predetermined path 22 are then entered into a data matrix and a mathematical model is produced that plots the movement of a node 20 at a preset velocity. A data matrix is also used to calibrate the field of view 70 of the plurality of cameras 16 such that the centre line 18 tracks the node 20 as it travels along the predetermined path 22.

As further illustrated in FIG. 1, the control apparatus 12 includes an interface panel 26 which is connected by way of cable 28 to a network device 30. The network device 30 communicates 14 with each of the cameras 16. It is envisaged that the communication 14 will be in the form of a broadcast signal. However, the communication could be by way of fixed cables where existing race infrastructure is used such as Steward's or viewing towers at horse racing events. The interface panel 26 includes, but is not limited to, a node velocity control bar 32, a joystick 34, a series of camera specific controls 36 and auxiliary switches 38. The interface panel 26 enables an operator to either independently control the pan, tilt and zoom of each of the cameras 16 or simultaneously control the movement of selected cameras 16 to track the movement of the node 20. Pan is defined as the side-to-side camera movement, the tilt is the up-and-down camera movement and the zoom is the visual in-and-out camera movement. The operator 54 either manually controls the camera's 16 focus or alternatively, the focus is automatically calculated as is well known in the prior art. The auto focus function is able to be calculated by the camera control system 10 because the positions of the cameras 16 and the position of the node 20 are known, thereby enable the lens's focal distance to calculated for a specified lens. It is envisaged that the cameras 16 will be mounted on encoded pan tilt servo heads or similar apparatus. Encoded pan tilt servo heads are able to calculate their pan and tilt bearings at all times.

Figure 2:
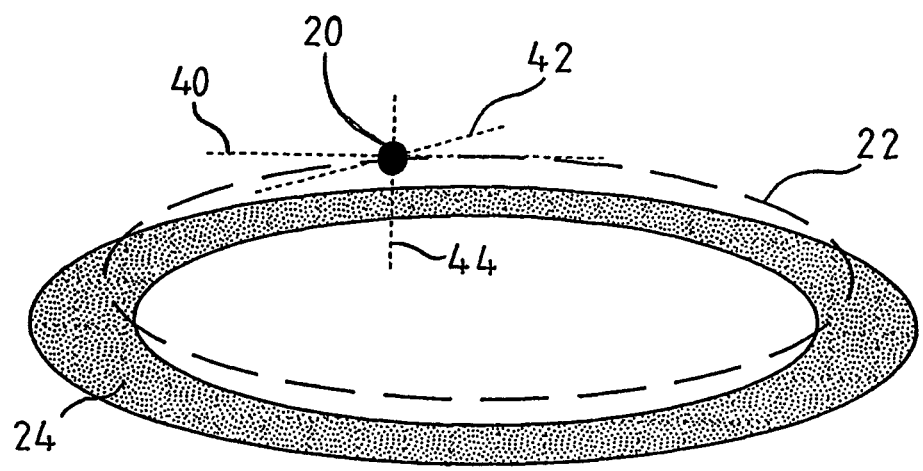
FIG. 2 is a schematic view of a track including a predetermined path and node illustrating x, y, z axes.

As illustrated in FIG. 2, the node 20 has a known spatial position along x, y, z coordinates 40, 42 and 44. In use the node 20 is used to track the position of race participants, for instance horses or greyhounds on a race track or a vehicle on a race course. Typically, when used in horse racing the node 20 is placed by the operator 54 in the centre of a group of race participants.

The node 20 can be set at any height above or below the predetermined path 22. This lateral displacement of the node 20 along the z axis 44 is manually adjusted via the control apparatus 12 or can be preset. It is envisaged that the camera control system 10 will include a data table that stipulates any predetermined displacement. Similarly, the centre line 18 of the camera 16 can be displaced from the node 20 in the vertical and horizontal planes during operation via the control apparatus 12.

Figure 3:
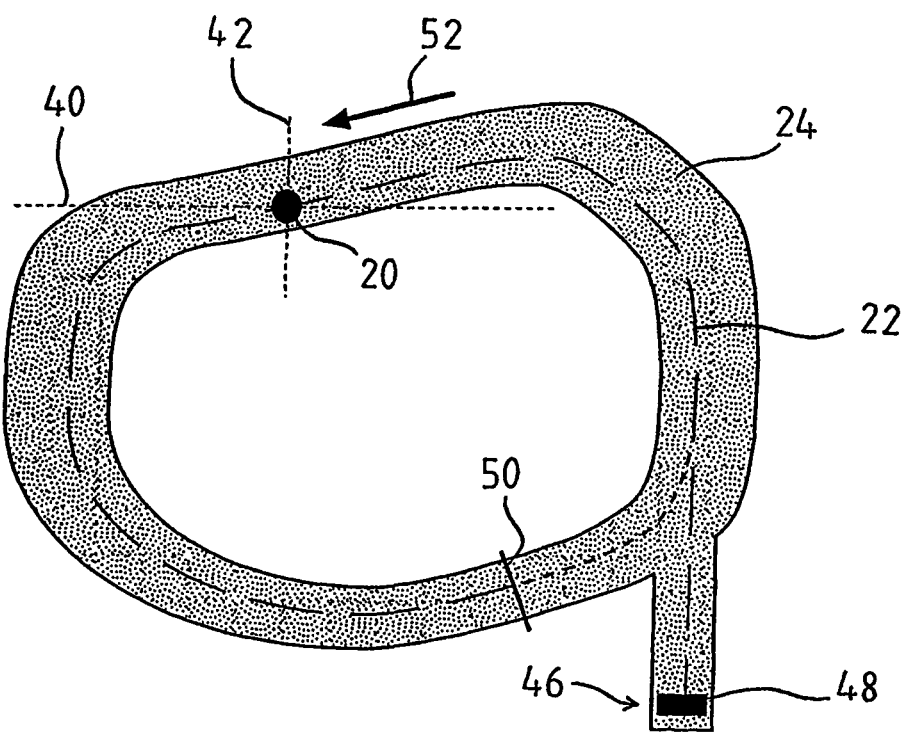
FIG. 3 is a top view of a horse racing track including a predetermined path and node.

The node 20 has a predetermined starting point 46 along the predetermined path 22. As illustrated in FIG. 3, the predetermined path 22 may correspond to a horse racing track with starting stalls 48 and a finishing line 50. The node 20 begins at the starting point 46 and moves in the direction of arrow 52 to the finishing line. It should be appreciated that each horse racing track may have several predetermined paths 22 as there can be several starting points around each race course. In practice it would simply be a matter of the operator selecting the appropriate starting point and corresponding predetermined paths 22.

Figure 4:
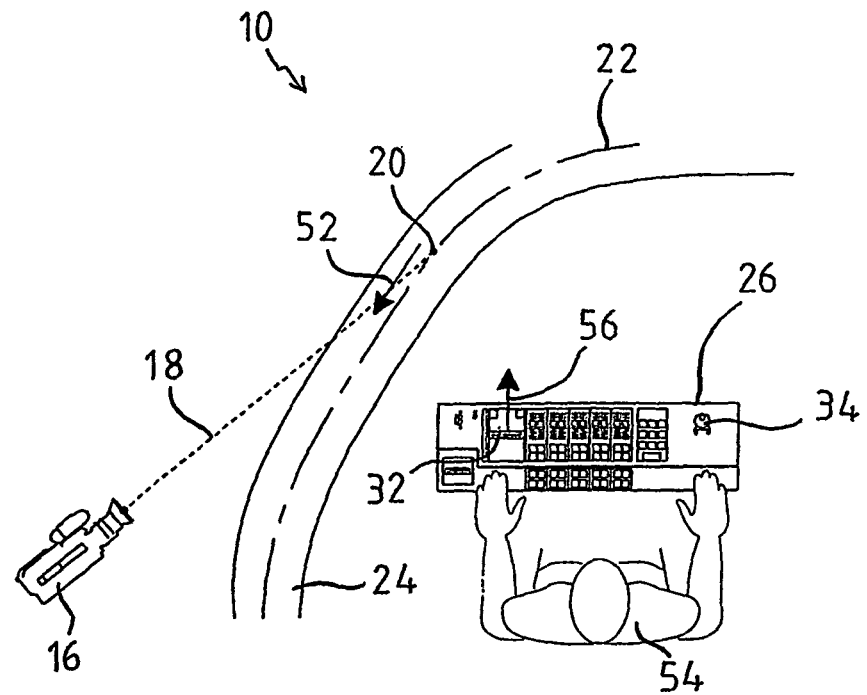
FIG. 4 is a schematic view of the camera control system of FIG. 1 illustrating control of the forward movement of the node.

As illustrated in FIG. 4, the operator 54 is able to control the forward movement of the node 20 along the predetermined path 22 by way of the node velocity control bar 32. The node velocity control bar 32 can be configured to particular velocity and acceleration calibrations and acts in a similar way to a thrust lever of a commercial airplane. As the operator moves the node velocity control bar 32 in the direction of the arrow 56 the velocity of the node 20 increases. Movement of the node velocity control bar 32 in the opposite direction would slow the speed of the node 20.

The velocity of the node 20 is controlled in typically three different ways.

Firstly, the speed of the node 20 can be directly controlled by the velocity control bar 32. A calibrated forward movement of the node velocity control bar 32 in the direction of the arrow 56 corresponds to an increase in the velocity of the node 20. A calibrated movement of the node velocity control bar 32 in the opposite direction results in a corresponding decreased velocity of the node 20.

Secondly, a particular speed can be specified to control the movement of node 20. The camera control system 10 can include a means of setting a predetermined velocity of the node 20. It is envisaged that the camera control system 10 will include a data table that enables the operator 54 to specify the speed of the node 20 within a variety of distances on a predetermined path 22. This specified speed still enables the operator 54 to make minor adjustments to the velocity of the node 20 using the node velocity control bar 32. This would be relevant where the speed of the race participants can be accurately estimated, for instance the speed of a vehicle around a race circuit or horse on a race track.

Third and finally, a delta speed function can be used to control the velocity of the node 20. The delta speed function is a derivative of the preset speed function wherein the node 20 moves at a predetermined velocity plus or minus the last manual adjustments of the node velocity control bar 32 performed by the operator.

Figure 5:
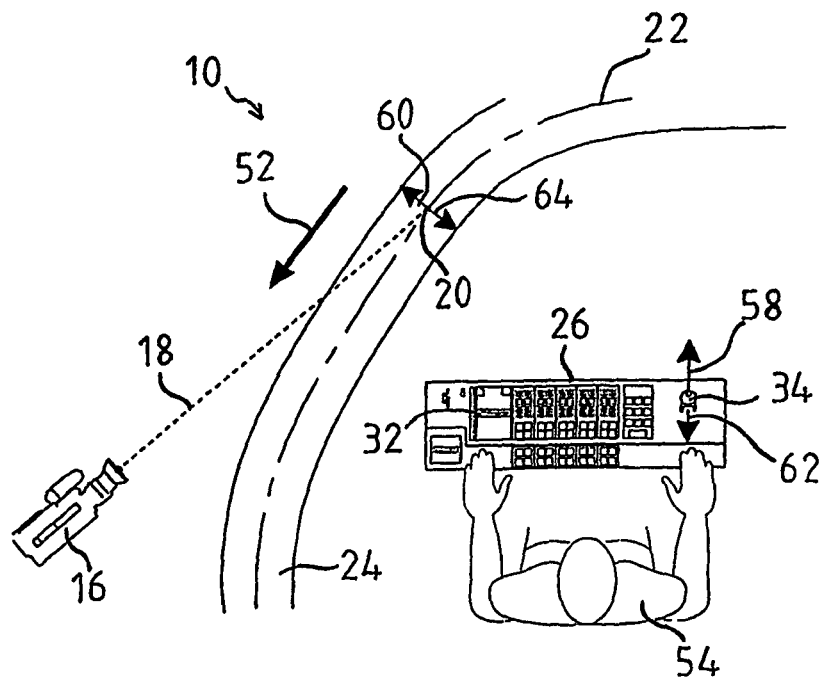
FIG. 5 is a schematic view of the camera control system of FIG. 1 illustrating control of the sideways lateral movement of the node.

The node 20 can be displaced from the predetermined path 22 in the vertical and horizontal planes. This displacement may be to take account of advertising that is displayed on television screens or to visually frame the race participants. As illustrated in FIG. 5, the lateral displacement of the node 20 from the predetermined path 22 is controlled by way of the joystick 34. When the joystick 34 is moved in the direction of arrow 58 the node 20 is displaced to the right of the predetermined path 22, or towards the outside rail, as indicated by arrow 64. Accordingly the centre line 18 of the camera 16 also moves to the right of the predetermined path 22. When the joystick 34 is moved in the direction of arrow 62 the node 20 and therefore the centre line 18 of the camera 16 moves to the left of the predetermined path 22 as indicated by arrow 60.

Figure 6:
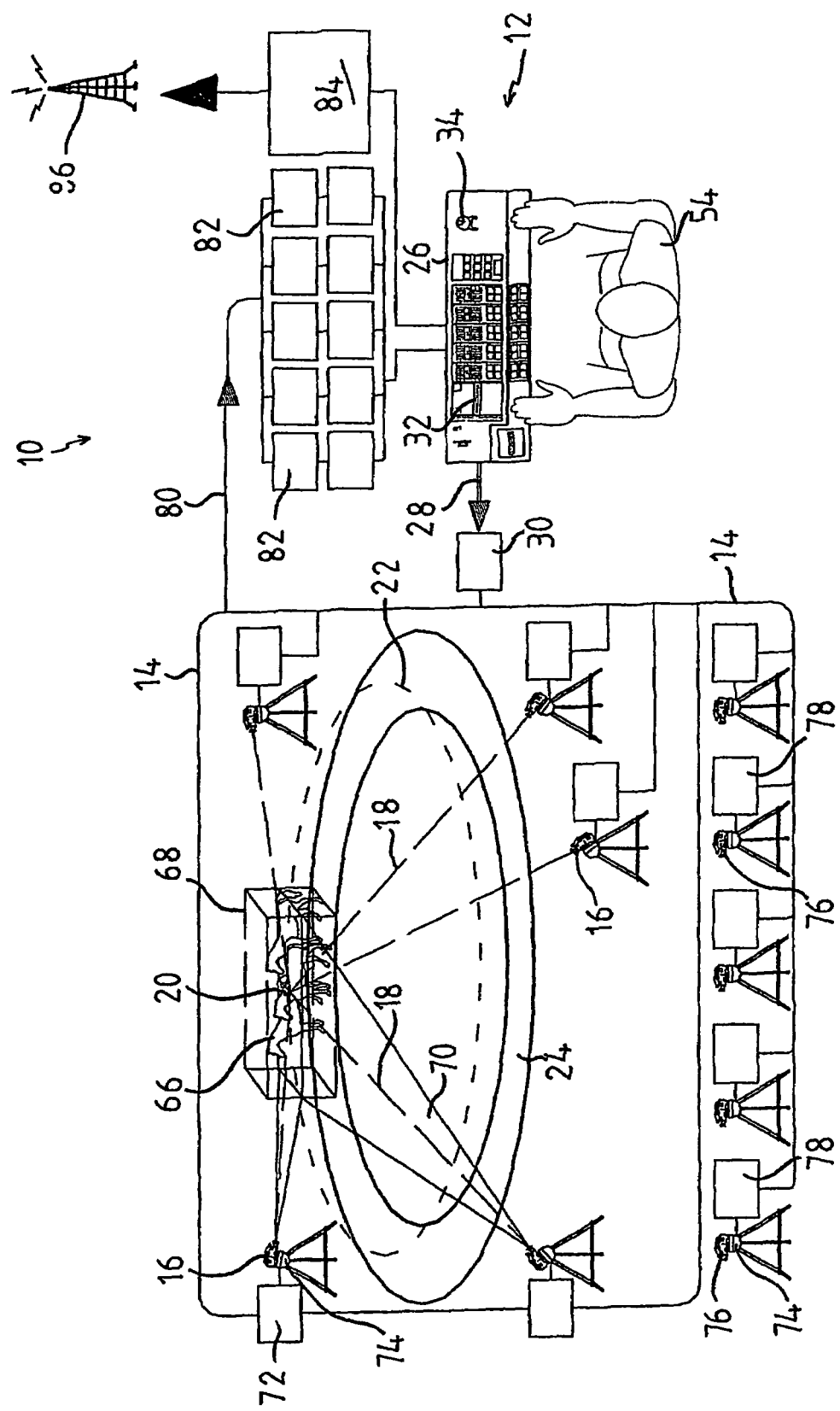
FIG. 6 is a second embodiment of the camera control system illustrating its use in relation to a horse race.

To assist in explaining the principles of the present invention the camera control system 10 will be described as being used to capture footage at a horse racing event. In a preferred embodiment, as illustrated in FIG. 6, the camera control system 10 is used to capture footage of a group of race participants, in this example being a group of horses 66. The node 20 is placed in the centre of the group of horses 66 and framed within zoom window 68, which is determined by the zoom width and length. The centre line 18 of the field of view 70 of each camera 16 tracks the node 20. The control apparatus 12 is in communication 14 with each of the cameras 16 via the network device 30. As illustrated in FIG. 6, each camera 16 includes a communication device 72 and is mounted on an encoded servo pan tilt head and tripod apparatus 74. The camera control system 10 further includes auxiliary cameras 76 with corresponding communication devices 78. These auxiliary cameras 76 can be placed at different locations around the track 24 to capture crowd shots or landscape footage. These auxiliary cameras 76 are controlled by the operator 54 and may be configured to track the node 20.

Unslaved cameras 16b or locked off cameras are utilised by the joystick operated switch 92 which enables their pan tilt zoom and focus to be set using the joystick 34, joystick zoom trigger and the focus wheel 102. When the joystick operator switch 92 is on, then the joystick 34, focus wheel 102 and joystick zoom trigger only control that specific camera 16. Switching off the joystick operated switch 92 sets the unslaved cameras 16b in that position and resets the joystick 34 to control the slaved cameras 16a. The zoom sliders 88 may still be utilised for individual slaved 16a and unslaved 16b cameras at all times.

Each of the cameras 16 and 76 transmits a signal 80 which is received by the control apparatus 12. The footage captured by each particular camera 16 and 76 is displayed on a separate display screen 82. The operator 54 is then able to select the best footage for the television production which is displayed on a master display 84. The television production is then broadcast 86 using a conventional analogue or digital signal.

Figure 7:
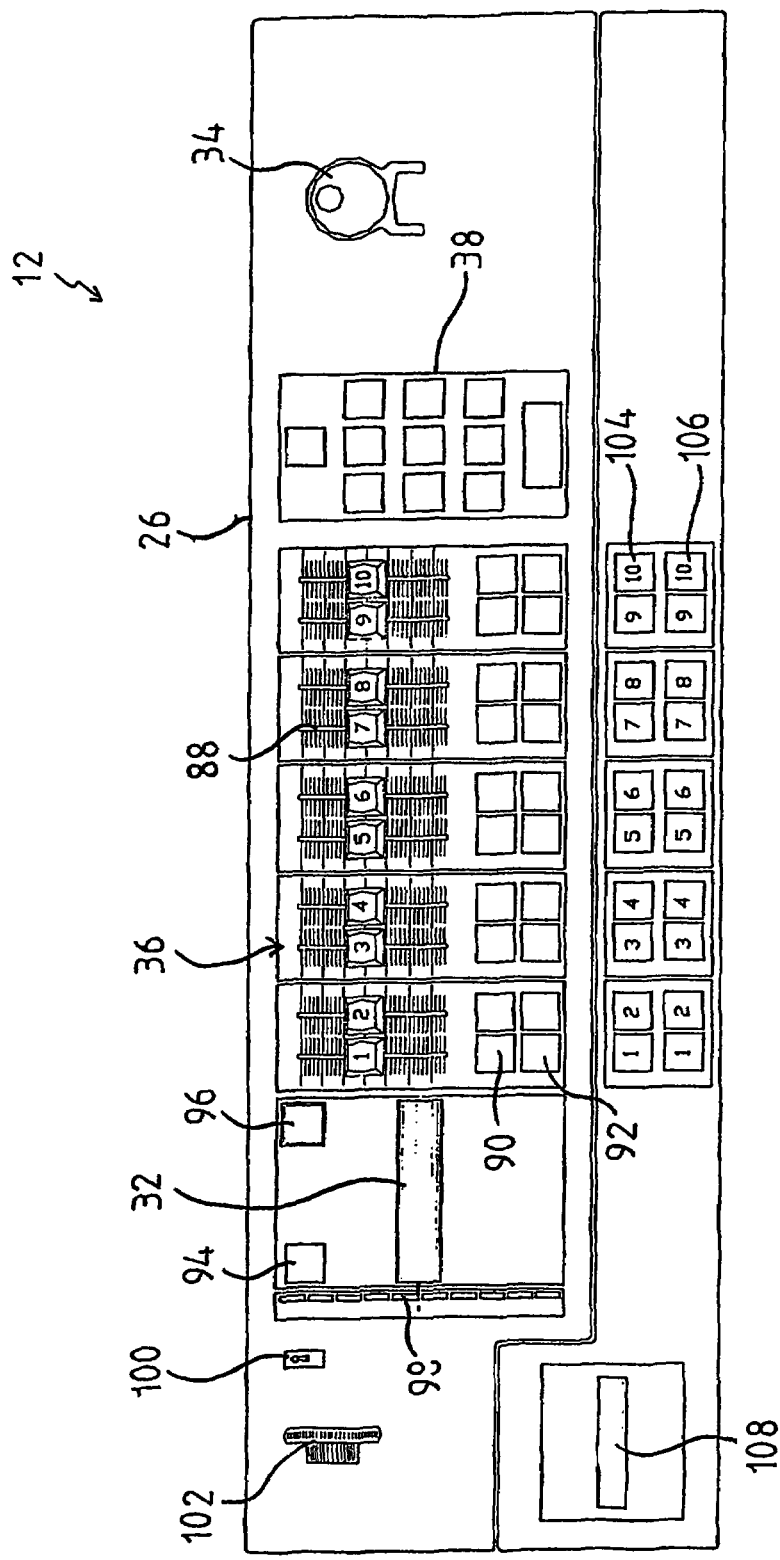
FIG. 7 is a top view of the interface panel of the camera control system of FIG. 6.

As illustrated in FIG. 7, the interface panel 26 includes a node velocity control bar 32, a joystick 34, a series of camera specific controls 36 and auxiliary switches 38. The camera specific controls 36 include a zoom slider 88, a slave switch 90 and a joystick operation switch 92. The slave switch 90 aligns the centre line 18 of the camera 16 with the node 20. The slave switch 90 engages the functions of the camera data table software and enables the selected camera's pan, tilt, zoom and focus calibrations to be automatically adjusted. The joystick operation switch 92 overrides the slave switch 90 and enables the operator 54 to independently control the pan, tilt and zoom of a specific camera 16 or 76.

The joystick 34 serves several functions; firstly it is able to control the cameras 16 or 76 which have the joystick operated switch 92 engaged. This enables the operator 54 to control the tilt, pan and zoom of individual cameras. Secondly, the joystick 34 is adapted to control the lateral displacement of the node 20 from the predetermined path 22. Thirdly, the joystick 34 is used to control the length and width of the zoom window 68.

The auxiliary switches 38 control programmed commands of the control software and enables the programming of a variety of visual sequences. The camera programming takes into consideration: multiple cameras, node 20 positions, pan calibrations, node 20 speed, zoom calibrations, timing functions, slaving and unslaving cameras and focus. An example of this visual sequencing of cameras is the finish of a horse race whereby the operator 54 presses a designated function button which allows a designated camera to follow the node 20 until it reaches a specified pan point, namely the finish line 50, at which point the camera unslaves from the node 20 and frames the finish line 50 in a specified zoom and pan calibration. Once all the horses have passed the finish line 50, the function button is engaged and the designated camera pans and zooms in a specified manner until it catches up to the node 20 which at this point has been slowed down by the operator 54 and is located directly adjacent to the winner. These visual sequences enable simple pre-composed choreographed cinematic sequences to be executed by one operator in real time using one or more cameras 16 and 76.

The interface panel 26 includes a preset speed switch 94 and direction change switch 96 associated with the node velocity control bar 32. The interface panel 26 also includes a coloured LED display 98 which corresponds with the position of the node velocity control bar 32. The delta speed switch 100 controls the operation of the delta speed function as previously discussed. While the focus wheel 102 is used to focus cameras 16 or 76 which have the joystick operated switch 92 engaged. The interface panel 26 further includes broadcast director operation controls, namely preview switches 104, final broadcast switches 106 and director fade bar 108 as is well known in the art.

Figure 8:
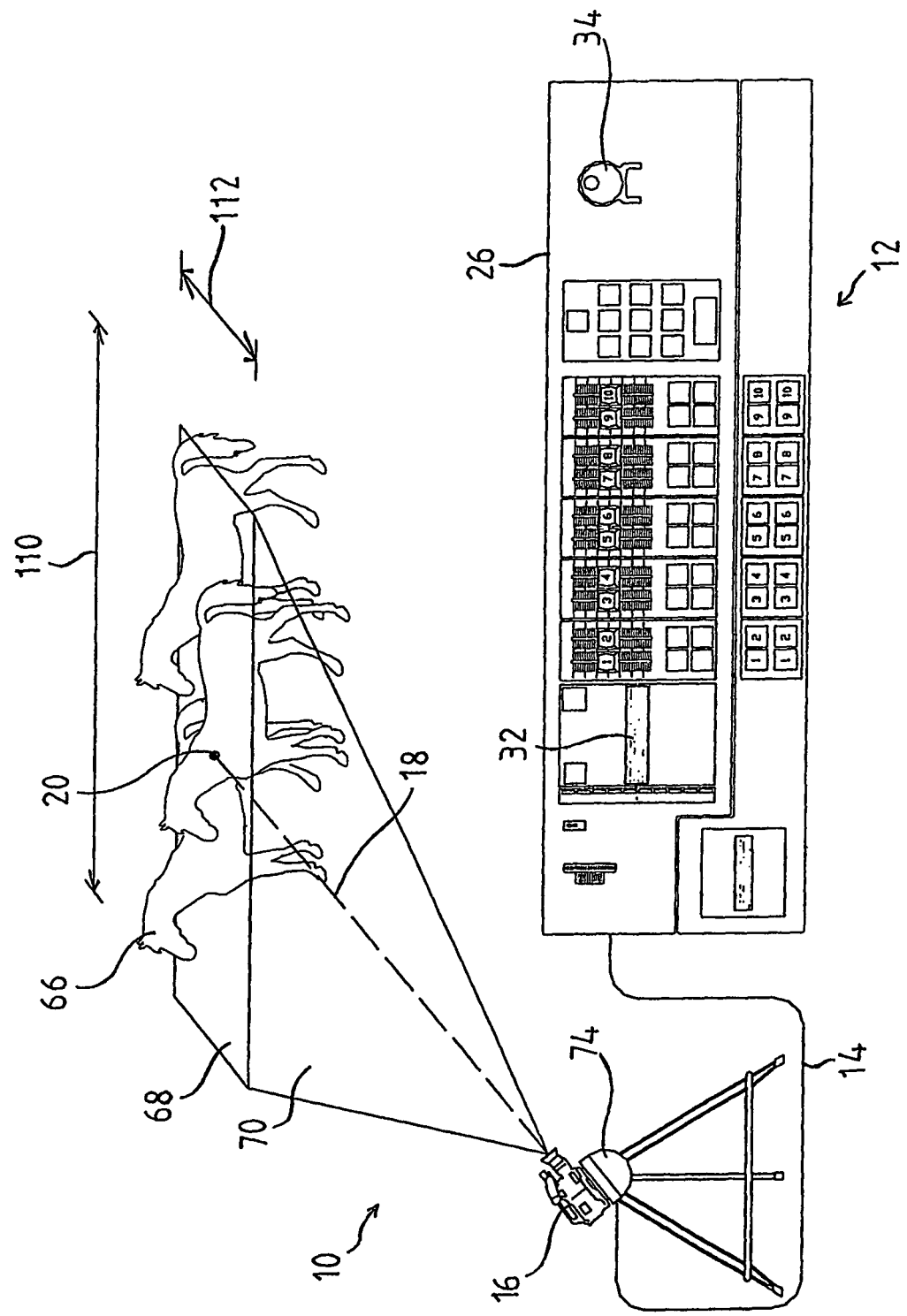
FIG. 8 is a schematic view of a zoom window.
Figure 9:
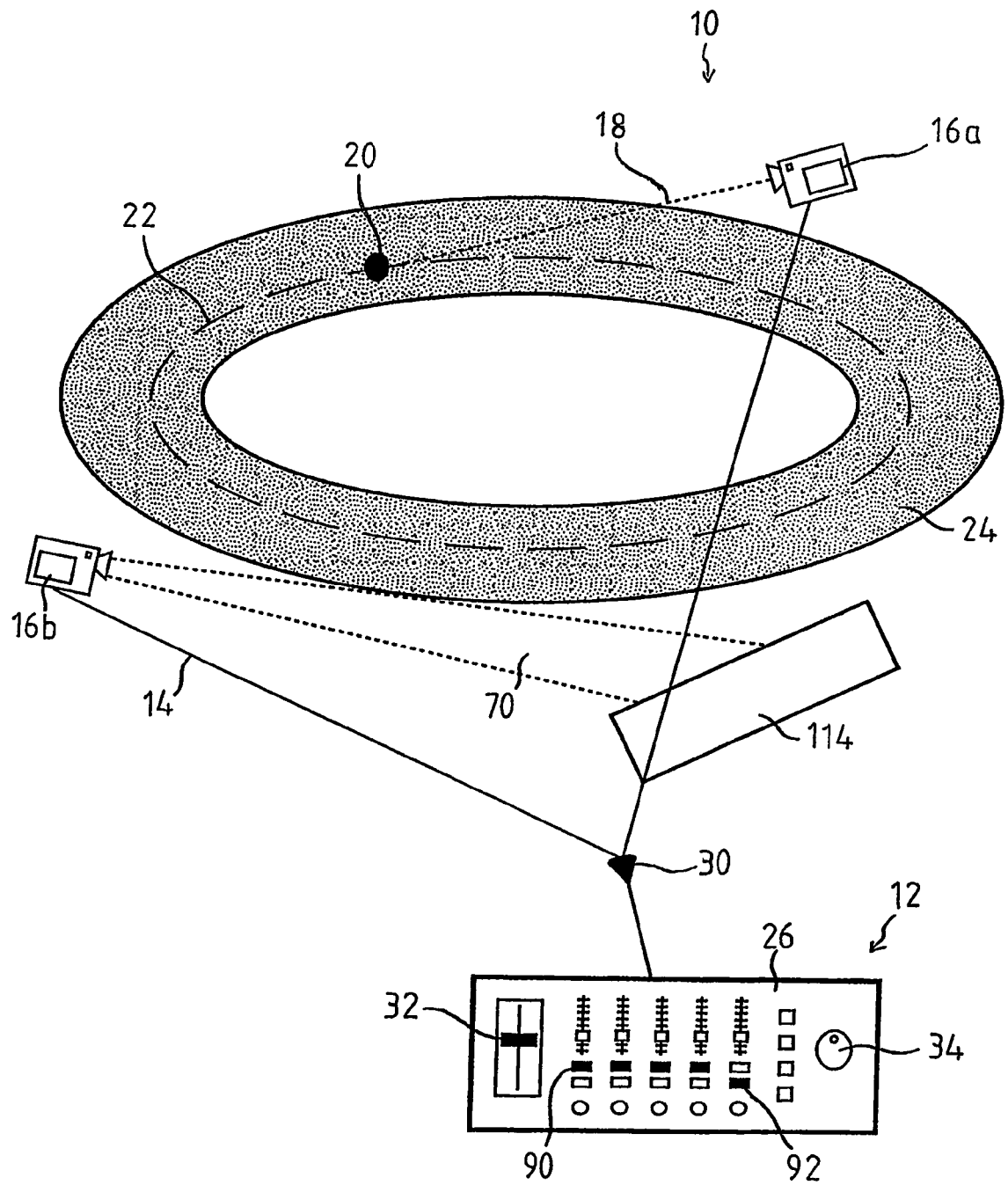
FIG. 9 is a schematic view of the camera control system of FIG. 1 illustrating slaved and unslaved cameras.

As further illustrated in FIGS. 8 and 9, the zoom window 68 is determined by the zoom width 110 and zoom length 112. These zoom parameters can be automatically set by the control software or adjusted in real time by the operator 54 via the joystick zoom trigger. In the present example the node 20 is located in the centre of the zoom window 68, however it should be appreciated that the node 20 could be dynamically located at a plurality of points within the zoom window 68 depending on the shot required. It is envisaged that the joystick will include a zoom trigger (not shown) which controls the length 112 of the zoom window 68 and a thumb toggle (not shown) which controls the width 110 of the zoom window 68.

The zoom window 68 enables all slaved cameras 16a to frame the same volume of space regardless of the camera's 16a position and angle. This is particularly useful for horse and dog racing where all entrants need to be framed in shot by multiple cameras around the track 24. The zoom window 68 is a volume of space defined by a zoom length 110 & zoom width 112. The node 20 is typically at the centre of the zoom window 68. This known zoom window 68 enables all slaved cameras 16a at all locations to zoom in and frame only the desired zoom window 68 in the camera's 16a field of view 70. Slaving a camera 16a also automatically focuses the camera 16a onto the node 20, the distance between the camera 16a and node 20 is the focal length that the camera control system 10 uses to calculate the required focus calibration dependent on the camera 16a lens specified in the camera control system's 10 software.

The zoom length 110 and zoom width 112 are controlled by the joystick 34.

The node 20 is at the centre of the zoom window 68, and as such the zoom window 68 can be moved in the same manner as the node 20 is moved. The individual zoom slider 88 for each camera 16 allows the operator 54 to expand or contract a camera's field of view 70 even if the camera 16a is slaved. In the case of a slaved camera 16a with a zoom slider 88 set at 20% then the default zoom window 68 size would be enlarged by 20%. If all slaved camera's 16a zoom sliders 88 are set at zero then the zoom window 68 is an identical space.

When a camera 16 is locked off or not in slaved mode then the zoom slider 88 still controls the camera 16 zoom calibrations. When a camera 16b has been switched to joystick operated 92 mode then the joystick 34 and in particular the joystick trigger (not shown) controls the camera's 16b zoom function.

FIG. 9 further illustrates the use of a slaved camera 16a and an unslaved camera 16b. The slave switch 90 that corresponds to the camera 16a is engaged.

Accordingly, camera 16a tracks node 20 as previously discussed. In contrast when the joystick operated switch 92 that corresponds to the camera 16b is engaged the operator 54 is able to independently position the camera 16b by use of the joystick 34. For instance, the unslaved camera 16b can be focused 70 on the grandstand 114 for a crowd shot.

The camera control system 10 may include a random start function. The camera control system 10 recognises the location of the track 24 and where a camera 16 and its encoded pan and tilt head is pointing. The operator 54 can aim the camera 16 at any location on the track 24 and activate the random start function which will automatically focus the camera 16 and follow a node 20 inserted at that random point at a specified preset speed. The random start node 20 travel path will be initially parallel to the predetermined path 22 but will be dragged onto the predetermined path 22 in prescribed manner as specified by control software. Each track 24 will have a defined coordinate map or drawing showing where the node 20 can travel parallel to the predetermined path 22 and where the node 20 will be automatically dragged onto the predetermined path 22. Manual adjustments to the node 20 may still occur in real time.

Figure 10:
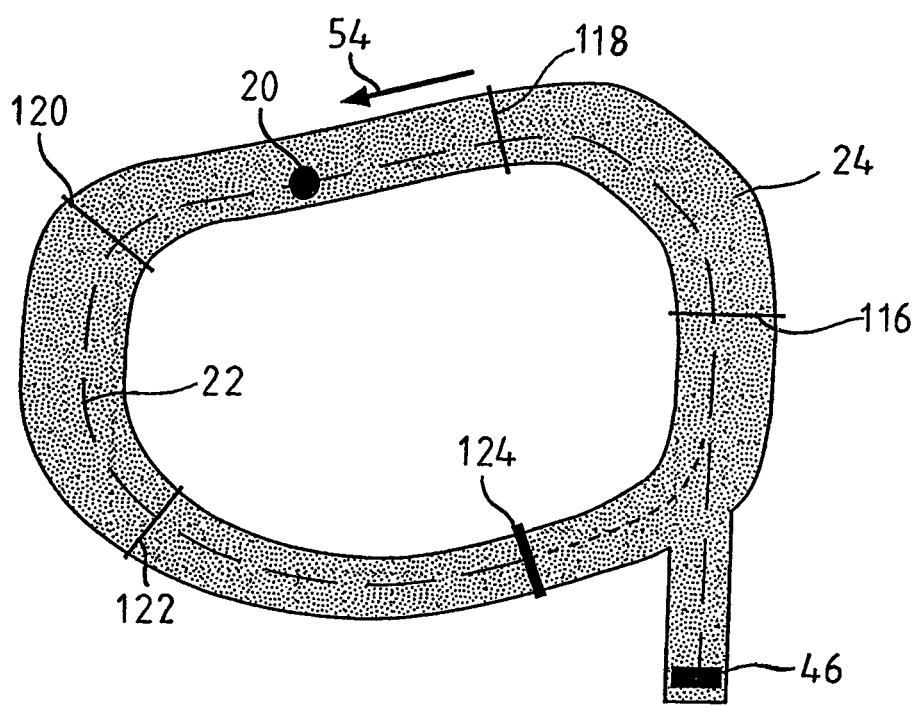
FIG. 10 is a top view of the horse racing track of FIG. 3 illustrating milestones.

In an alternate embodiment the camera control system 10, as illustrated in FIG. 10, utilises a series of milestones 116, 118, 120, 122 and 124 which are surveyed locations around a track 24 at uniform distances i.e. 10 m or 100 m. These milestones 116, 118, 120, 122 and 124 are used in conjunction with programmed commands which can be loaded onto the auxiliary switches 38. The milestones within the programmed commands enables the operator 54 to set the configuration of individual cameras 16 including their zoom, focus, pan, tilt, slaved, unslaved, node speed and node offset from the predetermined path at these points. These milestones 116, 118, 120, 122 and 124 enable a choreographed sequence of footage to be attached to a geographical location.

Figure 11:
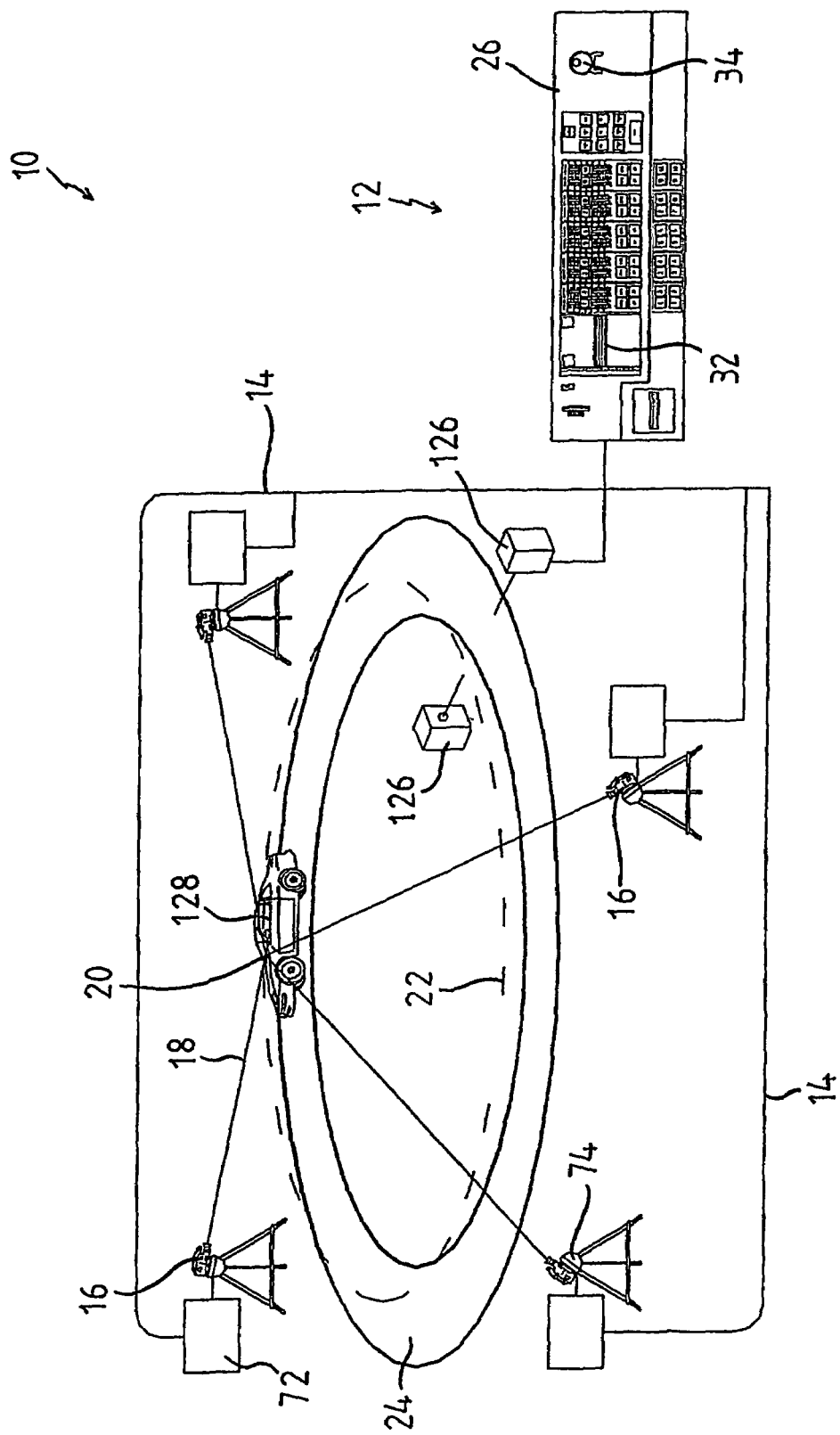
FIG. 11 is a schematic view of a third embodiment of the camera control system illustrating a motor race circuit including an electronic eye.

In a further alternate embodiment the camera control system 10, as illustrated in FIG. 11, is used in conjunction with an electronic eye 126 to track a motor car 128. The camera control system 10 can manage multiple nodes 20 which can be generated via an electronic eye 126 or manually. These multiple nodes 20 are initially inserted on the predetermined path 22 at the prescribed speed but can be manually adjusted. The operator 54 can skip from one node 20 to the next, either up or down the race order via the interface panel 26. The camera control system 10 also has a home function where the camera 16 is taken back to a specified direction until the next node 20 passes by. Continuously pressing the home function button will enable nodes 20 to pass without the camera 16 being slaved to the node 20. Typically the electronic eye 126 is used to initiate the movement of the node 20, whereby when the electronic eye is broken the node 20 begins to move along the predetermined path 22 at a predetermined velocity.

Although the cameras 16 are described as being rotatably fixed to a particular geographical location, it should be appreciated by the reader that the present invention is not limited to this configuration. The present invention could be used on mobile cameras such as those mounted on tracks providing the geographical position of the camera was known. For instance, this could be accomplished by attaching a GPS unit to the camera and having a real time feed to the controller. In this way the geographical position of the camera 16, in relation to node 20, would be known at all times.

The skilled addressee will now appreciate the many advantages of the present invention which provides for a camera control system. The camera control system can be used on different race courses and under different conditions. The use of slaved cameras provides cost benefits as separate operators are not required for each camera. The system also provides flexibility to provide the best coverage of course based sporting events. The precision gained from a slaved camera to a node also significantly increases the quality of broadcast footage and enables new and innovative approaches to broadcasting of sporting events.

It should be appreciated that the camera functions of zoom, tilt and pan have not been explained within the specification as they would be obvious to the person skilled in the art. The reader should understand that the invention resides in the use of a plurality of slaved camera that are configured to track a spatial node along a predetermined path.

Further advantages and improvements may very well be made to the present invention without deviating from its scope. Although the invention has been shown and described in what is conceived to be the most practical and preferred embodiment, it is recognized that departures may be made therefrom within the scope and spirit of the invention.

In any of the claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. An apparatus for camera control including:
   a plurality of cameras located around a physical race course, each camera being controllable to assume a plurality of viewing directions;
   a storage means for storing triaxial coordinates of the position of each said plurality of cameras, and coordinates of the physical race course boundaries, to thereby generate a computer generated matrix being a virtual map of said physical race course;
   a means for plotting a predetermined path on said virtual map, comprising sequential triaxial coordinates that correspond to geographical positions on the physical race course, the predetermined path being stored in said storage means;
   a computer generated node configured to move, either along, or parallel and offset from, the predetermined path on said virtual map, the movement of the computer generated node corresponding to the anticipated velocity of at least one untagged participant in a race on said physical race course, the at least one untagged participant not having a geographical position determining device attached thereto, the computer generated node being controlled to move along, or parallel and offset from, said predetermined path at the expected speed of said untagged participant along said racecourse; and
   a control means in communication with the plurality of cameras and storage means, wherein each camera is controlled such that its viewing direction substantially follows the relative position, on said physical race course, of the sequential triaxial coordinates of the computer generated node moving along, or parallel and offset from, the predetermined path in the virtual map to thereby capture images of said at least one untagged participant in said corresponding geographical positions on said race course, whereby the movement of said cameras being adjustable to correspond with the velocity of the at least one untagged participant.

2. The apparatus for camera control according to claim 1, wherein the coordinates of the physical race course boundaries are geographic coordinates that are determined by way of a geographical survey of the physical race course.

3. The apparatus for camera control according to claim 2, wherein the velocity of the computer generated node can be manually or automatically controlled.

4. The apparatus for camera control according to claim 1, wherein the control means is configured to control the functions of each of the plurality of cameras, including pan, tilt, zoom and focus.

5. The apparatus for camera control according to claim 1, wherein the plurality of cameras are adapted to track a first computer generated node and then a second computer generated node in sequence.

6. The apparatus for camera control according to claim 1, wherein the plurality of cameras are configured so that their fields of view automatically frame a selected area or volume around the computer generated node, whereby this area or volume can adopt any shape.

7. The apparatus for camera control according to claim 6, wherein the area or volume surrounding the virtual spatial computer generated node for each of the plurality of cameras can be manually or automatically adjusted.

8. The apparatus for camera control according to claim 6, wherein the field of view of each of the plurality of cameras can be collectively or individually controlled.

9. The apparatus for camera control according to claim 1, wherein the predetermined path includes a plurality of milestones and the velocity of the computer generated node and the plurality of camera's functions can be preprogrammed to a specific milestone.

10. A method of camera control comprising the steps of:
    undertaking a survey of a physical race course to determine the geographical coordinates of the physical race course boundaries;
    placing a plurality of cameras adjacent to the physical race course; determining the triaxial coordinates of the position of each said plurality of cameras; using the triaxial coordinates of said plurality of cameras and the geographical coordinates of the physical race course boundaries to generate a computer generated matrix being a virtual map of said physical race course;
    storing the virtual map on a storage means;
    plotting a predetermined path comprising sequential triaxial coordinates on said virtual map that corresponds to geographical positions on the physical race course, wherein the predetermined path is stored in the storage means;
    generating a computer generated node on said virtual map being configured to move, either along, or parallel and offset from, the predetermined path, the movement of the computer generated node corresponding to the anticipated velocity of at least one untagged participant in a race on said physical race course, the at least one untagged participant not having a geographical position determining device attached thereto, the computer generated node being controlled to move along, or parallel and offset from, said predetermined path at the expected speed of said untagged participant along said racecourse; and accessing the storage means, wherein each camera is controlled such that its viewing direction substantially follows the relative position on said physical race course of the sequential triaxial coordinates of the computer generated node moving along, or parallel and offset from, the predetermined path in the virtual map, to thereby track and capture images of the at least one untagged participant in said corresponding geographical positions of said physical race course, whereby the movement of said cameras are adjustable to correspond with the velocity of the at least one untagged participant.

11. The method of camera control according to claim 10, wherein the location of each of the plurality of cameras is determined by the use of a plurality of survey markers and a resection survey method.

12. The method of camera control according to claim 10, wherein the position of the computer generated node with respect to the untagged participant or participants in said race can be altered.

13. The method of camera control according to claim 10, wherein the survey is a geographical survey of the virtual race course undertaken using a global positioning system.

* * * * *